Nov. 3, 1942.  W. E. GREENE  2,301,037
HYDRAULIC BRAKE LOCK
Filed Jan. 26, 1942
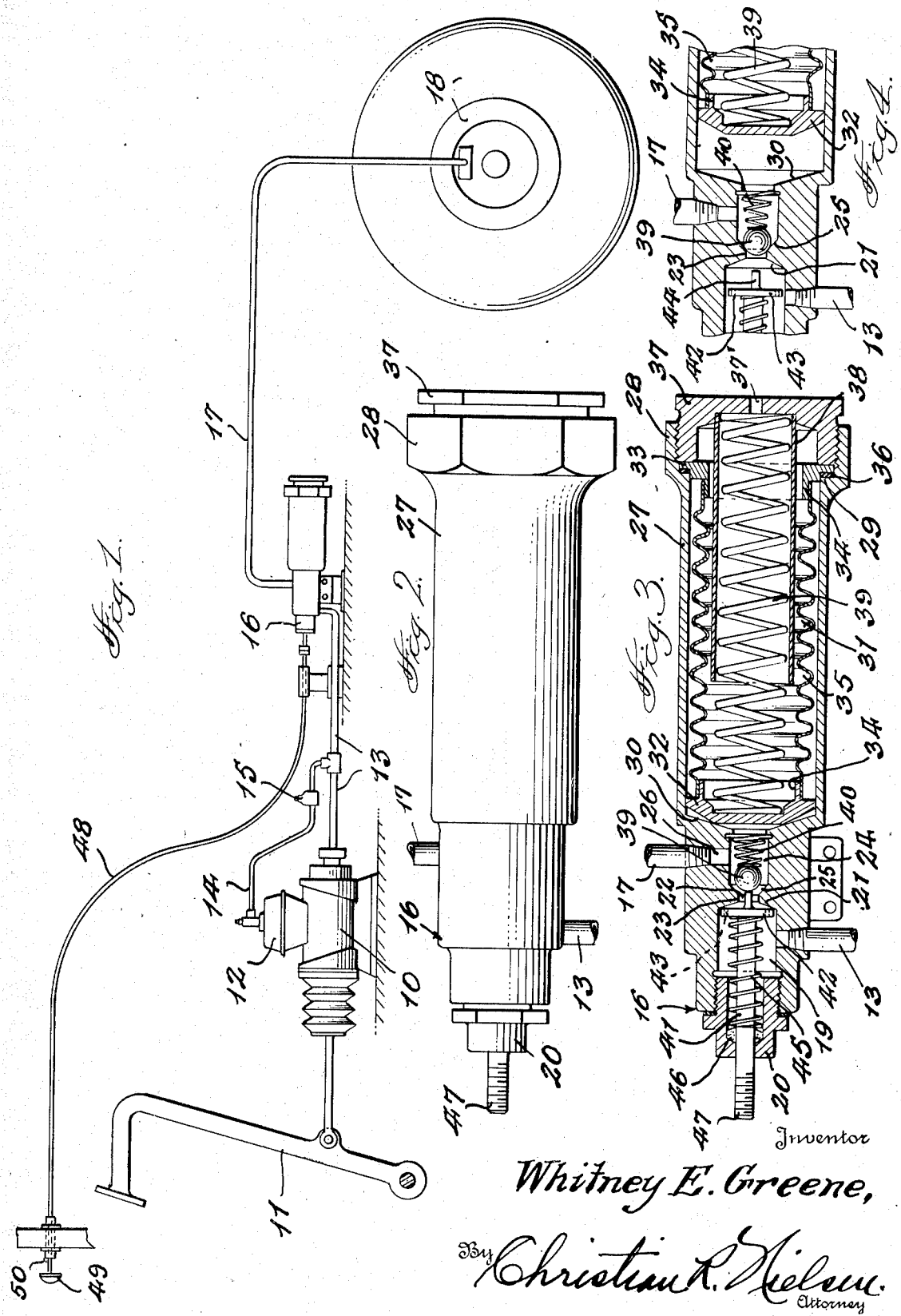
Inventor
Whitney E. Greene,
By Christian R. Nielsen.
Attorney Patented Nov. 3, 1942

2,301,037

UNITED STATES PATENT OFFICE 2,301,037

HYDRAULIC BRAKE LOCK

Whitney E. Greene, San Bernardino, Calif.

Application January 26, 1942, Serial No. 428,293

2 Claims. (Cl. 188—152)

This invention relates to a hydraulic brake lock and it consists in the constructions, arrangements and combinations herein described and claimed.

The present illustration of the invention discloses the device as installed in a braking system as applied to aircraft, wherein it will be noted that the customary hand-operated mechanical lever and latch for holding the piston of the master cylinder in its compressed or braking position is avoided. Such mechanical means have been effective for establishing sufficient pressure to park a ship, but the master cylinder is under constant strain and pressure over long periods of time with liability of break-down of the packing cups of the cylinder. Further, no provision for thermal expansion or contraction has been provided, the brakes becoming overloaded when the fluid in the system has expanded, due to a rise in temperature; and in some instances, an actual break-down in pressure has occurred by a drop in temperature, due to shrinkage of the fluid in the system.

It is therefore the cardinal object of the invention to provide a brake locking means in which undue strain is relieved from the master cylinder and associated packing glands; as well as providing means for thermal expansion or contraction of the braking fluid, thereby insuring proper application of the brakes when "set".

More specifically it is an object of the invention to provide a novel construction of valve and accumulator chamber which is susceptible to ready installation between a master cylinder and the brakes to be operated, which is of simple construction, light in weight and liable to a minimum degree to derangement.

Figure 1 is a schematic view illustrating my invention installed in a braking system, as applied upon aircraft.

Figure 2 is a side elevation of my valve and accumulator chamber.

Figure 3 is a longitudinal sectional view thereof.

Figure 4 is a fragmentary sectional view of the valve and accumulator chamber, showing the position of the movable parts in the "set" position of the brake.

In order that the invention may be fully understood, attention is first invited to Figure 1 of the drawing, wherein there is shown a master cylinder 10 of any approved construction, including an actuating pedal 11 and fluid reservoir 12. The master cylinder 10 embodies a fluid conduit 13 and a branch conduit 14 suitably connected with the reservoir 12 for return of fluid to the reservoir when required. A relief valve 15 of suitable construction is installed in the conduit 14.

The fluid conduit 13 is connected to a valve 16 forming an inlet thereto and an outlet conduit 17 is extended and operatively connected to the wheel and brake generally indicated by the reference character 18.

The novelty of the present invention resides in the construction and adaptation of the valve 16 and its associated accumulator chamber, which is shown in detail in Figures 3 and 4, and attention is now directed to these figures.

The valve 16 consists of a body portion, in the outer end of which there is formed a chamber 19 into which the conduit 13 opens, the chamber being interiorly threaded for reception of a packing gland 20. The inner end of the chamber 19 is formed with a conical seat 21 and a reduced bore 22 defining a wall 23. A second chamber 24 is formed in the body of the valve axially aligned with the chamber 19, the inner walls tapering inwardly to their juncture with the wall 23 defining a valve seat 25. An outlet port 26 is formed in the valve body in communication with the chamber 24 into which the conduit 17 is secured.

The valve body is continued as a cylinder 27 of suitable length terminating in an enlarged hexagonal or other shaped head 28, the latter being interiorly threaded and formed with a seat 29 inwardly of the threads for a purpose presently to be explained.

The interior of the cylinder 27 is smoothly finished and the inner end is formed with tapered walls merging into the chamber 24 and forming a valve seat 30.

A collapsible piston device 31 is mounted within the cylinder 27, consisting of a head 32 and an anchorage collar 33. The head 32 and collar 33 are each formed with a reduced extension 34 and preferably seam-sealed between respective extensions there is a bellows 35. The collar 33 is firmly held in the seat 29 upon a neoprene or suitable gasket 36, by means of an end cap 37 threadedly engaged in the head 28.

The cap 37 has axially fixed therein a sleeve 38 of a length considerably less than that of the cylinder, forming a guide and support for a helical spring 39 interposed between the head 32 and the end cap 37. The spring 39 functions to maintain the bellows 35 extended and the head 32 in snug engagement with the seat 30. The end cap 37 is provided with a vent port 37' so that air may be expelled under compression of the bellows.

A ball valve 39 is positioned within the chamber 24 held to the seat 25 by means of a helical spring 40.

Within the chamber 19 there is a plunger 41 upon the inner end of which a head 42 is integrally formed, of a diameter to be freely reciprocable in the chamber. The head 42 is provided with perforations 43 allowing a free flow of fluid to the chamber 24 and return therefrom. An axial extension 44 is formed on the plunger 41 in advance of the head 42, adapted to engage the ball valve 39 and of a length to hold the valve in unseated position when the plunger is moved to its full forward position.

A helical spring 45 is engaged upon the plunger 41 interposed between the head 42 and a packing 46 in the gland 20. The spring serves to hold the plunger in its forward position so that the extension 44 unseats the valve 39, and in addition the pressure exerted by the spring upon the packing 46 eliminates leakage of fluid around the plunger.

The plunger 41 is provided with a threaded portion 47 forming a means of connection with a suitable control cable 48, the latter being extended to a suitable position convenient for manipulation by a pilot. The cable 48 terminates in an operating knob 49, and will include a detent means 50 for maintaining the plunger 41 in its open operative position. The construction of the cable, knob and detent means is well understood and a detailed showing of these parts is not believed essential.

It should be understood that the bellows 34 and spring 39 are so proportioned as to withstand a pressure of not less than 75 P. S. I. so that the full supply of fluid in the master cylinder is available for braking operation. The expression "P. S. I." is employed to designate pounds per square inch.

We will assume that the valve and accumulator parts are in the position shown in Figure 3, and it is desired to apply the brakes 18. Pressure is exerted upon the pedal 11 actuating the master cylinder 10 forcing the fluid through the conduit 13 into the chamber 19 of the valve 16. The fluid then passes around and through the apertured head 42 into the chamber 24 and thence through the conduit 17 to the brake for braking action. The valve 39 is positively held in open position so that unrestricted flow and return of fluid is attained which is essential for braking a ship as it lands, for in some instances a pilot may require as much as 200 P. S. I., while in another 10 P. S. I. may be sufficient.

When pressure in the system goes beyond 75 P. S. I., the bellows 34 and spring 39 begin to compress due to pressure on the head 32 and when a pressure of 200 P. S. I. has been reached as required for parking purposes, the bellows and spring have substantially compressed and a charge of fluid is housed in the cylinder in advance of the head 32. Now in order to set or lock the brakes, it is only necessary to draw outwardly on the control cable 48 so as to release the detent 50 and turn the knob so that the detent is in inoperative position. When the cable 48 was drawn outwardly, the head 42 and extension 44 were retracted (see Figure 4), allowing the ball valve 39 to seat, trapping the fluid in the cylinder 27, the chamber 24, the conduit 17 and the brake 18. Should expansion occur in the fluid, this will be accommodated by further compression of the bellows and associated spring, while if contraction of the fluid should occur, the bellows and spring will expand so that a pressure of 200 P. S. I. will be maintained positively and permanently until released. To release the brakes it is only necessary to turn the knob 49 to initial position and press inwardly thereon so that the extension 44 will unseat the valve 39. The spring 45 will assist movement of the plunger in unseating the valve.

It will be understood that the relief valve 15 prevents the building up of an excessive pressure.

While I have shown and described specifically one embodiment of the invention, this is by way of illustration only, and I consider as my own all such modifications in construction as fairly fall within the scope of the appended claims.

I claim:

1. A locking means for hydraulic brakes comprising a body member having a chamber and a fluid inlet means, a second chamber formed in said body and having a valve seat between the two chambers, a spring-pressed valve cooperable with said seat at times, means for holding said valve unseated, an outlet port formed in said body in communication with said second chamber, a cylinder on said body in communication with the second chamber, a piston in said cylinder compressible under predetermined pressure for accommodation of fluid in advance thereof, the cylinder being provided with an open end having an annular seat formed interiorly thereof, the piston consisting of a head and an anchor fitting, the latter being complemental to said seat, a bellows connecting the head and anchor fitting, an end closure cap engaged with the opening of the cylinder for firmly seating the anchor fitting, spring means interposed between the closure cap and the head for maintaining the bellows in normal extended position, and means for releasing said valve holding means.

2. A locking means for hydraulic brakes comprising a body member having a chamber and a fluid inlet means, a second chamber formed in said body aligned therewith and having a valve seat between the two chambers, a spring-pressed valve cooperable with said seat at times, a spring-pressed plunger in said first chamber having an extension adapted to engage the valve and hold it from the seat, an outlet port formed in said body in communication with said second chamber, a cylinder on said body in communication with the second chamber, a piston in said cylinder compressible under predetermined pressure for accommodation of fluid in advance thereof, the cylinder being provided with a threaded open end having an annular seat formed interiorly thereof, the piston consisting of a head and an anchor fitting, the latter being complemental to said seat, a bellows connecting the head and anchor fitting, an end closure cap engaged in the threaded opening of the cylinder for firmly seating the anchor fitting, spring means interposed between the closure cap and the head for maintaining the bellows in normal extended position and means for retracting the plunger against the tension of its spring.

WHITNEY E. GREENE.